T. McWATTERS.
SAFE FOR SEA GOING VESSELS.
APPLICATION FILED JULY 27, 1914.

1,226,098.

Patented May 15, 1917.

WITNESSES:

INVENTOR.
Thomas McWatters
BY
ATTORNEY

UNITED STATES PATENT OFFICE.

THOMAS McWATTERS, OF CHESTNUT RIDGE, PENNSYLVANIA.

SAFE FOR SEA-GOING VESSELS.

1,226,098.     Specification of Letters Patent.     Patented May 15, 1917.

Application filed July 27, 1914. Serial No. 853,341.

*To all whom it may concern:*

Be it known that I, THOMAS McWATTERS, a subject of the King of Great Britain, residing at Chestnut Ridge, in the county of Fayette and State of Pennsylvania, have invented a new and useful Improvement in Safes for Sea-Going Vessels, of which improvement the following is a specification.

My invention relates to safes for use on sea-going vessels.

The object of my invention is to produce a safe in which may be stored all the valuables of passengers and in the event of a disaster at sea the said safe may be detached from the vessel and enabled to float on the surface of the sea until the same is picked up or rescued. I accomplish this object by means of the device hereinafter more specifically described, reference being had to the accompanying drawings forming part hereof in which, Figure 1 is a longitudinal central section.

Figure 1:
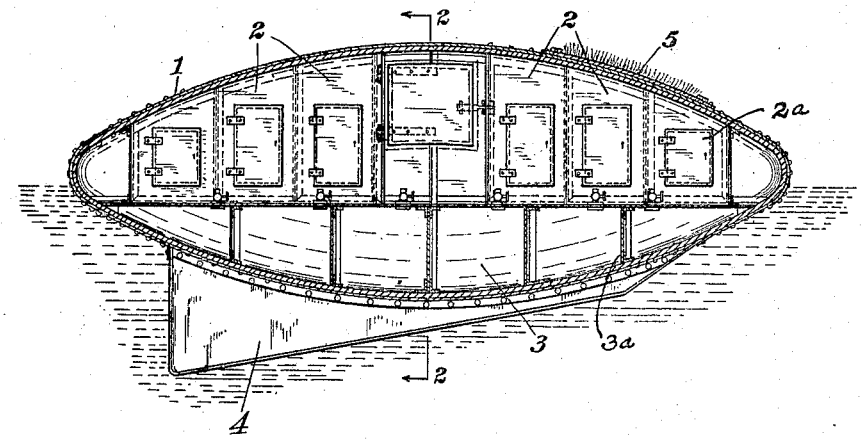
Figure 2:
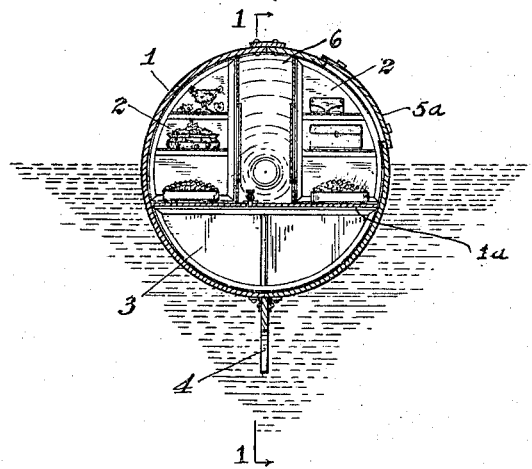

Fig. 2 is a transverse section on line 2—2 of Fig. 1.

Referring to the drawings, the numeral 1 designates a cigar shaped metallic shell which is designed to float upon the water in a horizontal position and is provided at the bottom thereof with a keel 4. A horizontally disposed floor 1ª is provided within the shell at a point above the bottom thereof and divides the interior of the shell into a lower chamber and an upper chamber, the lower chamber being subdivided by transverse partitions 3ª into a series of independent compartments from which the air is exhausted so as to provide a partial vacuum. The upper chamber is formed with a central corridor 6 extending longitudinally of the shell, and with a series of valuable receiving compartments 2 at each side of the corridor, said compartments being provided with doors 2ª facing upon the corridor. A door or manhole 5ª is provided in one side of the shell at a point toward the top thereof and provides a means for obtaining access to the interior of the shell for the purpose of placing valuables within the compartments 2 or removing the valuables therefrom. The top of the shell may be provided with a mirror 5 formed of heavy glass which is backed with mercury and protected in some suitable manner, the mirror being adapted to attract attention when the shell is floating on the surface of the sea.

Having described my invention, what I claim and desire to secure by Letters Patent is:

1. A buoyant safe including an elongated hollow shell adapted to float upon one side, a horizontal floor arranged within the shell at a point above the bottom thereof and dividing the interior of the shell into an upper chamber and a lower air chamber, transverse partitions subdividing the air chamber into a plurality of independent compartments, and a plurality of independent valuable receiving compartments arranged within the upper chamber.

2. A buoyant safe including an elongated hollow shell adapted to float upon its side, a horizontal floor arranged above the bottom of the shell and dividing the same into an upper chamber and a lower air chamber, a longitudinal row of independent valuable receiving compartments arranged within the upper chamber at each side thereof, and a door in the side of the shell for entering and leaving the upper chamber.

In testimony whereof, I have hereunto signed my name in the presence of two subscribing witnesses.

THOMAS McWATTERS.

In the presence of—
FLORENCE B. GARDNER,
CLARENCE A. WILLIAMS.

Copies of this patent may be obtained for five cents each, by addressing the "Commissioner of Patents, Washington, D. C."